No. 803,569. PATENTED NOV. 7, 1905.
E. DUCRETET.
INDUCTION TRANSFORMER FOR WIRELESS TELEGRAPHY RECEIVING STATIONS.
APPLICATION FILED MAR. 2, 1904.
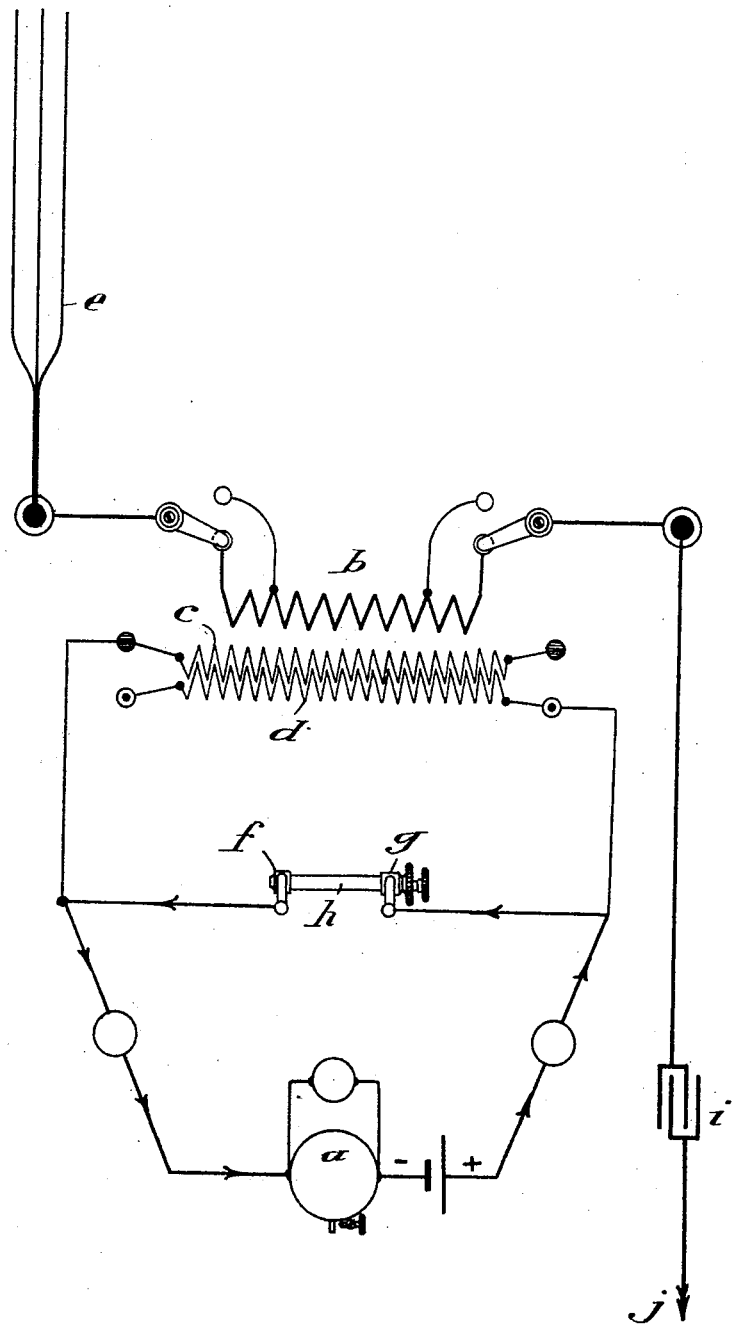

UNITED STATES PATENT OFFICE.

EUGÉNE DUCRETET, OF PARIS, FRANCE.

INDUCTION-TRANSFORMER FOR WIRELESS-TELEGRAPHY RECEIVING-STATIONS.

No. 803,569.     Specification of Letters Patent.     Patented Nov. 7, 1905.

Application filed March 2, 1904. Serial No. 196,133.

*To all whom it may concern:*

Be it known that I, EUGÉNE DUCRETET, a citizen of the French Republic, and a resident of Paris, France, have invented a new and Improved Induction-Transformer for Wireless-Telegraphy Receiving-Stations, of which the following is a specification.

This invention has reference to an induction-transformer for wireless-telegraphy receiving-stations.

In the year 1890 Professor Branly demonstrated that it is possible to bring a tube containing filings (now known variously as a radio-conductor, a coherer, a detector of electric waves) into action by placing it in the secondary circuit of a small induction-coil, the primary circuit receiving the electric waves. This induction-coil or induction-transformer comprises two circuits, known as the "primary" and "secondary," insulated from each other and wound concentrically on a cylindrical mounting or carrier.

My improved induction-transformer, which forms the subject-matter of this application, differs from that employed by Professor Branly and from all others employed hitherto in wireless-telegraphy receiving-stations.

In the accompanying drawing I illustrate one form of my invention diagrammatically, it being understood that this is merely given as an example and that the dimensions and the arrangement of the parts may be varied, according to requirements.

In the drawing, $a$ represents a telegraphic relay-receiver, to which my improved transformer is applied, but this transformer, besides its novel application to wireless-telegraphy stations, may be combined with any other receiver of Hertzian waves utilizing any system of radio-conductors, coherers and detectors, whether with telegraphic relays or directly in radio-telephonic stations in which Hertzian signals are received direct by a telephone, without registration on a Morse band.

My improved induction-transformer, as applied to wireless-telegraphy stations, comprises three circuits insulated from each other, one, $b$, which is the primary circuit, and two secondary circuits $c$, $d$, which are preferably wound parallel to each other. The two circuits $c$, $d$, effectively insulated from each other, as well as the primary circuit $b$, may be wound on an insulated cylindrical carrier or mounting, the primary $b$ being, fixedly or removably, placed either within or around the secondary circuits $c$, $d$. These three circuits $b$, $c$, $d$, insulated from each other, may be arranged in superposed flat spirals, the secondaries being, if desired, wound in parallel coils on the same insulating-disk. In all cases, suitable contact devices may be provided, to permit putting into action on the primary and the secondary circuits, the number of spirals most suitable to the proper regulation or tuning of the receiver of the Hertzian waves. The two secondary circuits $c$, $d$ are subject to the inductive action of the primary $b$, when it is traversed by the oscillatory current, produced at a distance by the transmitter of a wireless-telegraphy station. Thus, as diagrammatically shown in the drawing, these means, new in their application to wireless-telegraphy receivers, constitute two neighboring secondary circuits, insulated from each other, and each having a free extremity; the Hertzian waves received by the antenna $e$ thus arrive at the extremities $f$, $g$ of the detector, radio-conductor, coherer $h$ by electromagnetic and electrostatic induction, with a perfect symmetry and a maximum of effect. This arrangement is very efficient for receiving electric waves from a distance. A station will be provided with several of these induction-transformers, which it will be possible to combine together as desired.

The various parts of a wireless-telegraphy receiver being described in books on the subject, I have not thought it necessary to give a detailed description of them, but $m$, $n$ and $o$ designate the usual inductances or choking-coils, while $p$ is the battery of the relay $a$.

Having now fully described my invention, what I claim, and desire to secure by Letters Patent, is—

1. In a wireless-telegraphy receiver, an oscillation-transformer comprising a single primary and a plurality of secondary windings insulated from each other, each secondary winding having a free extremity.

2. In a wireless-telegraphy receiver, an oscillation-transformer comprising a single primary and a plurality of secondary windings parallel to and insulated from each other, each secondary winding having a free extremity, a receiving device connected with one end of the primary, and a ground-wire connected with the opposite end of such primary.

3. In a wireless-telegraphy receiver, an oscillation-transformer comprising a single primary and a plurality of secondary windings parallel to and insulated from each other, each secondary winding having a free extremity, a receiving device connected with one end of the primary, a ground-wire connected with the opposite end of such primary, and a condenser interposed in the ground-wire connection.

In testimony whereof I have hereunto set my hand in presence of two witnesses.

EUGÉNE DUCRETET.

Witnesses:
HANSON C. COXE,
JOHN BAKER.